United States Patent
Stewart (10) Patent No.: US 10,436,588 B2
(45) Date of Patent: Oct. 8, 2019

(54) VIBRATING-MASS GYROSCOPE SYSTEMS AND METHOD

(71) Applicant: Robert E. Stewart, Woodland Hills, CA (US)

(72) Inventor: Robert E. Stewart, Woodland Hills, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 6 days.

(21) Appl. No.: 15/621,666

(22) Filed: Jun. 13, 2017

(65) Prior Publication Data

US 2017/0284802 A1    Oct. 5, 2017

Related U.S. Application Data

(63) Continuation of application No. 14/341,380, filed on Jul. 25, 2014, now Pat. No. 9,726,491.

(51) Int. Cl.
*G01C 19/5705* (2012.01)
*G01C 19/5733* (2012.01)

(52) U.S. Cl.
CPC ..... *G01C 19/5705* (2013.01); *G01C 19/5733* (2013.01)

(58) Field of Classification Search
CPC .................. G01C 19/5705; G01C 19/5733
See application file for complete search history.

(56) References Cited

U.S. PATENT DOCUMENTS

| 5,821,420 | A  | 10/1998 | Cho et al. |
| 6,230,563 | B1 | 5/2001  | Clark et al. |
| 6,296,779 | B1 | 10/2001 | Clark et al. |
| 7,213,458 | B2 | 5/2007  | Weber et al. |
| 7,231,824 | B2 | 6/2007  | French et al. |
| 7,484,411 | B2 | 2/2009  | Walmsley |
| 8,272,266 | B2 | 9/2012  | Zhang et al. |
| 8,322,213 | B2 | 12/2012 | Trusov et al. |

(Continued)

FOREIGN PATENT DOCUMENTS

| JP | H0916680 A | 7/1997 |
| JP | 2002148047 A | 5/2002 |

(Continued)

*Primary Examiner* — Xin Y Zhong (74) *Attorney, Agent, or Firm* — Tarolli, Sundheim, Covell & Tummino (57) ABSTRACT

A vibrating-mass gyroscope system includes a substantially planar vibrating-mass including opposite first and second surfaces and electrodes that extend longitudinally in a periodic pattern across the first and/or second surfaces. The electrodes include sets of drive and sense electrodes that are capacitively coupled to respective matching sets of drive and sense electrodes associated with a housing and which are separated from and facing the respective first and second surfaces. A gyroscope controller generates a drive signal provided to one of the array of drive electrodes and the substantially matching array of drive electrodes to provide for in-plane periodic oscillatory motion of the vibrating-mass, and generates a force-rebalance signal that is provided to one of the array of sense electrodes and the substantially matching array of sense electrodes to calculate rotation of the vibrating-mass gyroscope system about an input axis.

16 Claims, 4 Drawing Sheets

(56) References Cited

U.S. PATENT DOCUMENTS

| | | |
|---|---|---|
| 2002/0179983 A1 | 12/2002 | Hartwell et al. |
| 2006/0156815 A1* | 7/2006 | Chen .................. G01C 19/5719 73/504.12 |
| 2008/0236280 A1* | 10/2008 | Johnson ............. G01C 19/5719 73/504.14 |
| 2008/0264167 A1* | 10/2008 | Kandori ............. G01C 19/5719 73/504.12 |
| 2010/0076797 A1 | 3/2010 | Doerfler et al. |
| 2011/0030472 A1 | 2/2011 | Aziz et al. |
| 2013/0055787 A1 | 3/2013 | Geiger et al. |
| 2013/0098153 A1 | 4/2013 | Trusov et al. |

FOREIGN PATENT DOCUMENTS

| | | |
|---|---|---|
| JP | 2002515976 A | 5/2002 |
| WO | WO9745699 | 12/1997 |

* cited by examiner

VIBRATING-MASS GYROSCOPE SYSTEMS AND METHOD

RELATED APPLICATIONS

This application is a continuation of U.S. patent application Ser. No. 14/341,380, filed 25 Jul. 2014, which is incorporated herein in its entirety.

TECHNICAL FIELD

This disclosure relates generally to sensor systems, and specifically to a vibrating-mass gyroscope systems and method.

BACKGROUND

There are a number different types of vibrating-mass gyroscope systems that can be configured to calculate rotation about a sensitive (e.g., input) axis. One type of gyroscope is a Coriolis vibratory gyroscope (CVG). One example of a CVG is a tuning fork gyroscope in which two masses (e.g. tines) can vibrate in plane along a drive axis. In response to an applied angular rate about an input axis parallel to the tines of the tuning fork, Coriolis forces cause the tines to vibrate out of plane along a sense axis (e.g., 90° relative to a drive axis). The amplitude of the out-of-plane motion in open loop instruments or the force required to rebalance and null the out-of-plane motion in closed-loop instruments can correspond to a measure of the angular rate applied about the input axis.

SUMMARY

One embodiment of the invention includes a vibrating-mass gyroscope system. A sensor system includes a substantially planar vibrating-mass including opposite first and second surfaces and electrodes that extend longitudinally in a periodic pattern across the first and/or second surfaces. The electrodes include sets of drive and sense electrodes that are capacitively coupled to respective matching sets of drive and sense electrodes associated with a housing and which are separated from and facing the respective first and second surfaces. A gyroscope controller generates a drive signal provided to one of the array of drive electrodes and the substantially matching array of drive electrodes to provide for in-plane periodic oscillatory motion of the vibrating-mass, and generates a force-rebalance signal that is provided to one of the array of sense electrodes and the substantially matching array of sense electrodes to calculate rotation of the vibrating-mass gyroscope system about an input axis.

Another embodiment of the invention includes a method for calculating rotation about an input axis in a vibrating-mass gyroscope system. The method includes monitoring a drive pickoff signal associated with one of an array of drive electrodes that extend longitudinally in a periodic pattern across at least one of a first surface and a second surface of a substantially planar vibrating-mass and a substantially matching array of drive electrodes that extend longitudinally in a periodic pattern across at least one of a first surface and a second surface of a housing. The first surface of the substantially planar vibrating-mass can face the first surface of the housing and the second surface of the substantially planar vibrating-mass faces the second surface of the housing. The method also includes providing a drive signal to the one of the array of drive electrodes of the substantially planar vibrating-mass and the substantially matching array of drive electrodes of the housing based on the drive pickoff signal to provide an in-plane periodic oscillatory motion of the substantially planar vibrating-mass. The method also includes monitoring a force-rebalance pickoff signal associated with one of an array of sense electrodes that extend longitudinally in a periodic pattern across at least one of the first and second surfaces of the substantially planar vibrating-mass and a substantially matching array of sense electrodes that extend longitudinally in a periodic pattern across at least one of the first and second surfaces of the housing. The method further includes providing a force-rebalance signal to the one of the array of sense electrodes of the substantially planar vibrating-mass and the substantially matching array of sense electrodes of the housing based on the force-rebalance pickoff signal to calculate a rotation of the vibrating-mass gyroscope system about an input axis.

Another embodiment of the invention includes a vibrating-mass gyroscope system. The system includes a sensor system comprising a plurality of substantially planar vibrating-masses that each comprise a first surface, a second surface opposite the first surface, and a plurality of electrodes that extend longitudinally in a periodic pattern across each of the first and second surfaces. The plurality of electrodes can include an array of drive electrodes and an array of sense electrodes that are capacitively coupled to a substantially matching array of drive electrodes and a substantially matching array of sense electrodes, respectively, associated with a housing and which are separated from and facing the respective at least one of the first and second surfaces of each of the plurality of vibrating-masses. The system also includes a gyroscope controller configured to generate a drive signal that is provided to one of the array of drive electrodes and the substantially matching array of drive electrodes associated with each of the plurality of vibrating-masses to provide for an in-plane periodic oscillatory motion of each of the plurality of substantially planar vibrating-masses. The gyroscope controller also generates a force-rebalance signal that is provided to one of the array of sense electrodes and the substantially matching array of sense electrodes associated with each of the plurality of vibrating-masses to calculate a rotation of the vibrating-mass gyroscope system about an input axis.

DETAILED DESCRIPTION

This disclosure relates generally to sensor systems, and specifically to a vibrating-mass gyroscope systems and method. The vibrating-mass gyroscope system includes a sensor system and a gyroscope controller. The sensor system can include at least one vibrating-mass that is arranged as a substantially planar vibrating-mass having a first surface and a second surface opposite the first surface. The vibrating-mass(es) can include an array of drive electrodes and an array of sense electrodes that extend longitudinally in a periodic pattern across at least one of the first and second surfaces of the vibrating-mass(es). As an example, the drive electrodes and the sense electrodes can extend in orthogonal directions with respect to each other, and can be arranged on the same surface (e.g., both surfaces) of the vibrating-masses with respect to each other. The sensor system can also include a housing that includes respective matching arrays of drive electrodes and sense electrodes that are arranged on respective surfaces of the housing facing the vibrating-mass(es), such that the matching arrays of electrodes can be capacitively coupled with the arrays of drive electrodes and sense electrodes associated with the vibrating-mass(es).

The gyroscope controller can be configured to generate a drive signal and a force-rebalance signal that are provided to the arrays of drive electrodes and sense electrodes, respectively, associated with the vibrating-mass(es) and the housing. For example, the respective signals can be provided to the electrodes on the housing while the electrodes on the vibrating-mass(es) are electrically coupled to a bias voltage. The drive signal can thus provide an electrostatic force that induces an in-plane periodic oscillatory motion of the vibrating-mass(es), such as at a frequency that is approximately equal to a resonant frequency of a vibrating-mass spring system that is coupled to the housing (e.g., less than 50 kHz). As an example, the in-plane periodic oscillatory motion can be 180° out-of-phase with respect to a given pair of vibrating-masses. The force-rebalance signal can likewise provide an electrostatic force to provide a force-rebalance of the vibrating-mass(es) in response to rotation of the sensor system about an input axis. As an example, the electrostatic force for force-rebalance of the vibrating-mass(es) can be orthogonal with respect to the in-plane periodic oscillatory motion provided by the drive signal. A magnitude of the force-rebalance signal, and thus the electrostatic force, that is required to maintain the vibrating-mass(es) at a null position of a pickoff along a sense axis can correspond to a combination of a rate of rotation of the sensor system about the input axis and gyroscope bias. Therefore, the magnitude of the force-rebalance signal can be implemented by the gyroscope controller (e.g., an associated inertial sensor processor) to calculate the angular rotation of the sensor system about the input axis (e.g., upon compensation of gyroscope bias).

Figure 1:
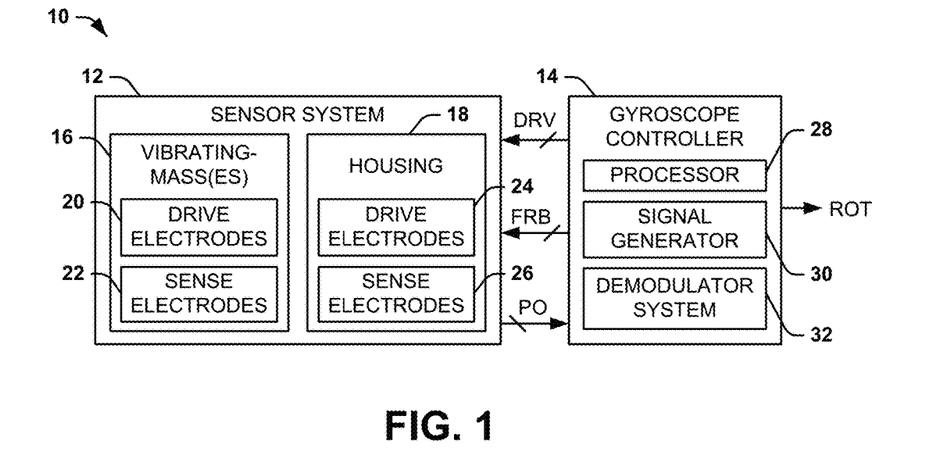
FIG. 1 illustrates an example of a vibrating-mass gyroscope system.

FIG. 1 illustrates an example of a vibrating-mass gyroscope system 10. The vibrating-mass gyroscope system 10 can be implemented in any of a variety of applications with which accurate measurement of rotation may be necessary, such as aerospace and nautical navigation. The vibrating-mass gyroscope system 10 includes a sensor system 12 and a gyroscope controller 14.

The sensor system 12 includes at least one vibrating-mass 16 that is arranged as a substantially planar inertial mass. As an example, the vibrating-mass(es) 16 can be arranged as an even-number quantity (e.g., four) of vibrating-masses. For example, the vibrating-mass(es) 16 can be fabricated as a layer of silicon. The sensor system 12 also includes a housing 18 that can envelope the vibrating-mass(es) 16, such as including a layer above the vibrating-mass(es) 16 and a layer below the vibrating-mass(es) 16. As an example, each of the vibrating-mass(es) 16 can be coupled to the housing 18 via spring-mass systems (e.g., flexures) that can allow for in-plane motion of the vibrating-mass(es) 16 in orthogonal directions. In the example of FIG. 1, the vibrating-mass(es) 16 can each include an array of drive electrodes 20 and an array of sense electrodes 22, and the housing 18 includes an array of drive electrodes 24 and an array of sense electrodes 26, with each array being associated with a respective one of the vibrating-mass(es) 16. Each of the arrays of drive electrodes 20 and sense electrodes 22 can be arranged on at least one of a first surface (e.g., a top surface) and a second surface (e.g., a bottom surface) opposite the first surface. Similarly, each of the arrays of drive electrodes 24 and sense electrodes 26 can be arranged on at least one of a first surface (e.g., a top surface) that faces the first surface of the vibrating-mass(es) 16 and a second surface (e.g., a bottom surface) that faces the second surface of the vibrating-mass(es) 16. Therefore, the drive electrodes 20 and the drive electrodes 24 can be capacitively coupled with respect to each other, and the drive electrodes 22 and the drive electrodes 26 can be capacitively coupled with respect to each other.

The gyroscope controller 14 is configured to generate drive signals DRV that are provided to at least one of the arrays of drive electrodes 20 and 24 to generate electrostatic force to provide an in-plane periodic oscillatory motion of the vibrating-mass(es) 16. For example, the drive signals DRV can have a frequency that is approximately equal to a resonant frequency associated with one or more springs and the vibrating-mass(es) 16 that is coupled to the housing 18. As an example, in the example of plural vibrating-masses 16, the in-plane periodic oscillatory motion can be provided at 180° out-of-phase with respect to each given pair of vibrating-masses to provide counter-balanced motion of the vibrating-mass(es) 16. The gyroscope controller 14 is also configured to generate force-rebalance signals FRB that are provided to at least one of the arrays of sense electrodes 22 and 26 to generate electrostatic force to null the sense pickoff and the motion of the vibrating-mass(es) 16 in response to rotation of the sensor system 12 about an input axis and gyroscope bias. For example, the force-rebalance signals FRB can have a frequency that is approximately equal to the frequency of the drive signals DRV (e.g., approximately equal to the resonant frequency).

The drive signals DRV and the force-rebalance signals FRB can be generated at an amplitude that is based on demodulated pickoff signal(s). The demodulated pickoff signals PO can have a frequency that is significantly greater than the frequency of the force-rebalance signals FRB (e.g., an order of magnitude or greater). As an example, the sense electrodes 22 and 26 can be arranged in a periodic array that extend longitudinally and orthogonally with respect to a longitudinal extension of the respective drive electrodes 20 and 24. Therefore, rotation of the sensor system 12 about the input axis can result in motion of the vibrating-mass(es) 16 orthogonally with respect to the in-plane periodic oscillatory motion associated with the drive electrodes 20 and 24. Accordingly, the electrostatic force that is generated by the sense electrodes 22 and 26 in response to the force-rebalance signals FRB can force the vibrating-mass(es) 16 to be maintained at a null position along a sense axis. As described herein, the term "null position" corresponds to a position of the vibrating-mass(es) 16 along the sense axis corresponding to an approximate zero value associated with the demodulated pickoff signal(s).

The gyroscope controller 14 includes a processor 28, a signal generator 30, and a demodulator system 32. The signal generator 30 is configured to generate the drive signals DRV that are provided to the drive electrodes 20 and/or 24 and the force-rebalance signals FRB that are provided to the sense electrodes 22 and/or 26. In response to the application of the drive signals DRV and the force-rebalance signals FRB, pickoff signals PO are provided to the demodulator system 32. As an example, the pickoff signals PO can correspond to amplitude-modulated pickoff signals that are capacitively coupled to the drive electrodes 20 and 24 and/or the sense electrodes 22 and 26 in response to motion of the vibrating mass(es) 16. The pickoff signals PO can thus be demodulated via the demodulator system 32 to determine an appropriate magnitude of the respective drive signals DRV and force-rebalance signals FRB, such as to maintain the in-plane periodic oscillatory motion of the vibrating-mass(es) 16 and to maintain the vibrating-mass(es) 16 in the null position in the sense axis, respectively.

Thus, the processor 28 can calculate the magnitude of the force-rebalance signals FRB in a manner that is indicative of the rate of angular rotation of the sensor system 12 about the input axis and gyroscope bias. As an example, a magnitude of the force-rebalance signal, and thus the electrostatic force, that is required to maintain the vibrating-mass(es) 16 at the null position along the sense axis can correspond to a rate of rotation of the sensor system 12 about the input axis (e.g., including a gyroscope bias). Therefore, the magnitude of the force-rebalance signals FRB can be implemented by the processor 28 to calculate the angular rotation of the sensor system 12 about the input axis, such as after compensating for the gyroscope bias. Accordingly, the gyroscope controller 14 can provide the measurement of the angular rate of rotation about the input axis as an output signal ROT. As an additional example, the drive electrodes 20 and 24 and the sense electrodes 22 and 26 can be interchangeable with respect to the drive signals DRV and the force-rebalance signals FRB to provide mode reversal for self-calibration of the gyroscope bias.

Figure 2:
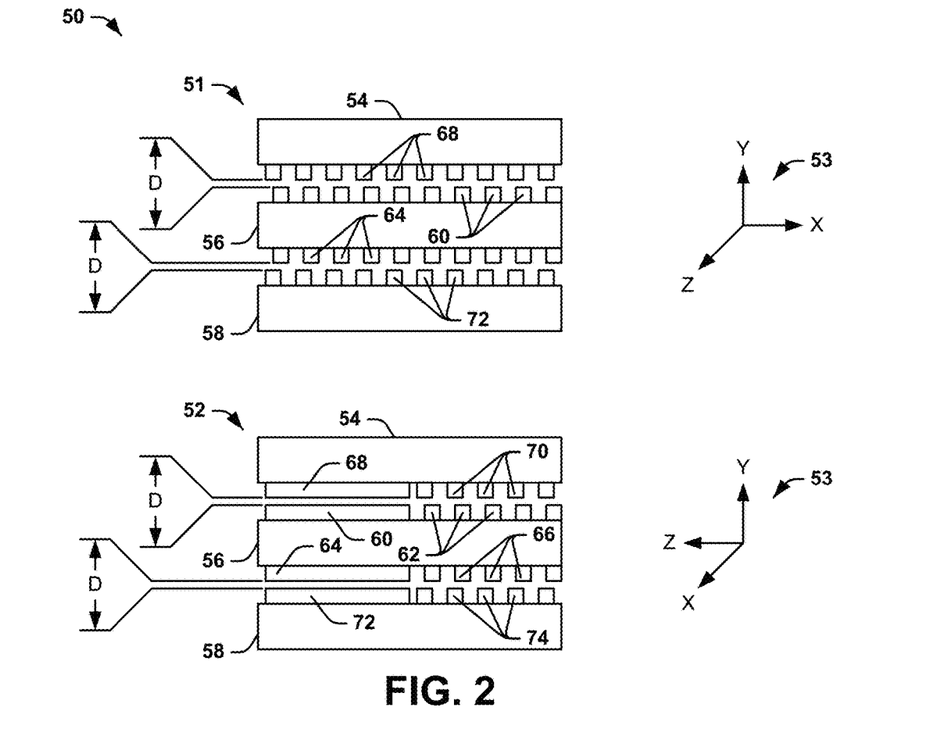
FIG. 2 illustrates an example of a sensor system.

FIG. 2 illustrates an example of a sensor system 50. The sensor system 50 is demonstrated in the example of FIG. 2 in a first view 51 and a second view 52 based on a Cartesian coordinate system 53, such that the second view 52 is rotated 90° about the Y-axis relative to the first view 51 (i.e., right-hand rotated about the −Y direction). The sensor system 50 can correspond to the sensor system 12 in the example of FIG. 1. Therefore, reference is to be made to the example of FIG. 1 in the following description of the example of FIG. 2.

The sensor system 50 includes a first cover layer 54, a vibrating-mass 56, and a second cover layer 58. In the example of FIG. 2, the vibrating-mass 56 is demonstrated as substantially planar, with the first cover layer 54 being provided as a layer above the vibrating-mass 56 and the second cover layer 58 being provided as a layer below the vibrating-mass 56. As an example, the vibrating-mass 56 can be a layer of etched silicon, and the first and second cover layers 54 and 58 can each be formed from etched silicon-on-insulator (SOI) layers. The first cover layer 54 and the second cover layer 58 can collectively form part of the housing 18 to which the vibrating-mass 56 can be coupled via spring-mass systems (not shown) to allow for in-plane motion of the vibrating-mass 56 relative to the first and second cover layers 54 and 58 in an X-Z plane, as demonstrated by the Cartesian coordinate system 53.

In the example of FIG. 2, the vibrating-mass 56 includes a first array of drive electrodes 60 and a first array of sense electrodes 62 that are disposed on a top surface of the substantially planar vibrating-mass 56, and includes a second array of drive electrodes 64 and a second array of sense electrodes 66 that are disposed on a bottom surface of the substantially planar vibrating-mass 56 opposite the top surface. The drive electrodes 60 and 64 and the sense electrodes 62 and 66 each extend longitudinally across the respective top and bottom surfaces of the vibrating-mass 56 in a manner such that the drive electrodes 60 and 64 extend along the Z-axis and the sense electrodes 62 and 66 extend along the X-axis, and thus orthogonally with respect to the drive electrodes 60 and 64. Similarly, the first cover layer 54 includes an array of drive electrodes 68 and an array of sense electrodes 70 that are disposed on a surface facing the top surface of the substantially planar vibrating-mass 56, and the second cover layer 58 includes an array of drive electrodes 72 and an array of sense electrodes 74 that are disposed on a surface facing the bottom surface of the substantially planar vibrating-mass 56.

The arrays of drive electrodes 68 and 72 and the arrays of sense electrodes 70 and 74 can be arranged as substantially matching the respective arrays of drive electrodes 60 and 64 and sense electrodes 62 and 66, such as based on dimensions, quantity, and general arrangement. The drive electrodes 60 and sense electrodes 62 can be separated from the respective matching drive electrodes 68 and 70 by a distance "D" (e.g., approximately 2 μm), and the drive electrodes 64 and sense electrodes 66 can be separated from the respective matching drive electrodes 72 and 74 by the distance "D". In the example of FIG. 2, the vibrating-mass 56 is demonstrated as being at a rest state (e.g., mechanical spring forces that are acting upon the vibrating-mass 56 are substantially equal and opposite). The arrays of drive electrodes 68 and 72 and the arrays of sense electrodes 70 and 74 are demonstrated as substantially off-alignment with respect to the respective matching arrays of drive electrodes 60 and 64 and sense electrodes 62 and 66. The drive electrodes 60 and sense electrodes 62 can be capacitively coupled to the respective matching drive electrodes 68 and 70, and the drive electrodes 64 and sense electrodes 66 can be capacitively coupled to the respective matching drive electrodes 72 and 74 based on an amount of overlap of the respective electrodes along a Y-axis, such as in response to rotation about an input axis that can be parallel to the Y-axis. Accordingly, the electrostatic force can be a modulated attractive force with respect to the matching sets of electrodes to provide for a periodic oscillatory motion and a force-rebalance, as described in greater detail herein.

Figure 3:
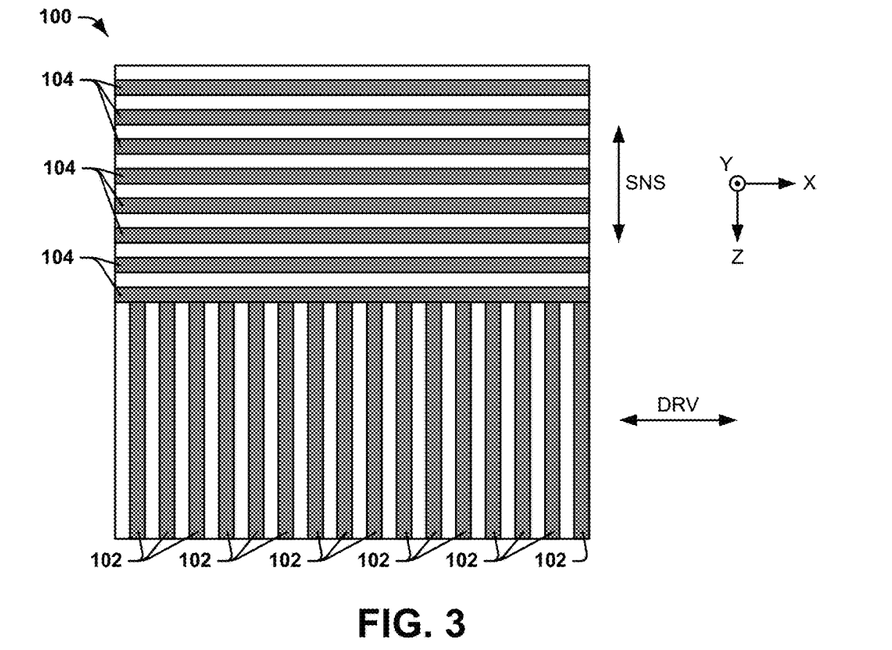
FIG. 3 illustrates an example of a vibrating-mass.

FIG. 3 illustrates an example of a vibrating-mass 100. The vibrating-mass 100 can correspond to the vibrating-mass 56 demonstrated in the example of FIG. 2, such as from an overhead view along the Y-axis of the Cartesian coordinate system 58. Thus, the vibrating-mass 100 is demonstrated in the example of FIG. 3 in a view of either the top surface or the bottom surface of the vibrating-mass 100. The vibrating-mass 100 includes an array of drive electrodes 102 and an array of sense electrodes 104. The drive electrodes 102 and the sense electrodes 104 each extend longitudinally across the surface of the vibrating-mass 100 in a manner such that the drive electrodes 102 extend along the Z-axis and the sense electrodes 104 extend along the X-axis, and thus orthogonally with respect to the drive electrodes 102. As an example, the opposite surface of the substantially planar vibrating-mass 100 can likewise include a substantially similar (e.g., equal) arrangement of drive electrodes and sense electrodes. In the example of FIG. 3, the array of drive electrodes 102 and the array of sense electrodes 104 each occupy approximately half of the area of the vibrating-mass 100. However, it is to be understood that one of the arrays of drive electrodes 102 and force-rebalance 104 can occupy a relatively larger area of the surface of the vibrating-mass 100. Additionally, it is also to be understood that the designation of the drive electrodes 102 and force-rebalance electrodes 104 can be interchangeable consistent with the arrangement of respective electrodes on the opposing surfaces.

As described previously, the vibrating-mass 100 can correspond to the vibrating-mass 56, and can thus be arranged between the first and second cover layers 54 and 58. As an example, the first and second cover layers 54 and 58 can thus each include arrays of drive electrodes and sense electrodes that substantially match the arrays of drive electrodes 102 and sense electrodes 104. As also described previously, the arrangement of the arrays of drive electrodes 102 and sense electrodes 104 can be such that the arrays of drive electrodes 102 and sense electrodes 104 can be unaligned (e.g., laterally offset) with respect to the matching electrodes on the first and second cover layers 54 and 58 in a rest state. Therefore, in response to the drive signal DRV, an electrostatic force can be generated between the drive electrodes 102 and the substantially matching drive electrodes associated with the respective housing to provide for periodic oscillatory movement of the vibrating-mass 100 in the X-Z plane, and specifically along the X-axis corresponding to a drive axis ("DRV"). Similarly, in response to the force-rebalance signal FRB, an electrostatic force can be generated between the sense electrodes 104 and the substantially matching drive electrodes associated with the respective housing to provide force-rebalance of the vibrating-mass in response to movement of the vibrating-mass 100 in the X-Z plane, and specifically along the Z-axis corresponding to a sense axis ("SNS").

As an example, the drive electrodes 102 and the sense electrodes 104 can be separate by gaps that are approximately 25 µm wide and approximately 50 µm deep. The drive electrodes 102 can have a length of approximately 1400 µm, and the sense electrodes 104 can have a length of approximately 2800 µm. Therefore, the sense electrodes 104 can have a length that is approximately twice the length of the drive electrodes 102. However, based on the orthogonal arrangement of the drive and sense electrodes 102 and 104 and that the drive and sense electrodes 102 and 104 each occupy approximately half the area of the surface of the vibrating-mass 100, the quantity of drive electrodes 102 can be approximately double the quantity of the sense electrodes 104. Therefore, the drive electrodes 102 and the sense electrodes 104 can each have an approximately equal electrostatic force in response to an approximately voltage stimulus, and can exhibit a substantially equal capacitance. Such an arrangement of the drive electrodes 102 and sense electrodes 104 with respect to the capacitive coupling to the respective electrodes of the housing can result in significant performance improvement over typical variable area electrostatic forcer systems for forcing and detecting motion (e.g., "comb" drive systems).

Figure 4:
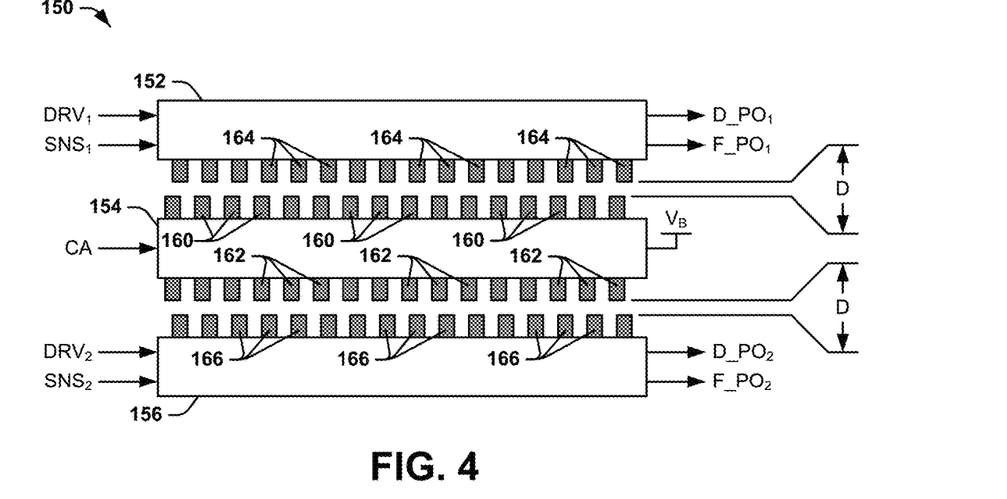
FIG. 4 illustrates another example of a sensor system.

FIG. 4 illustrates another example of a sensor system 150. The sensor system 150 can correspond to the sensor system 12 in the example of FIG. 1 and/or the sensor system 50 in the example of FIG. 2. As an example, the sensor system 150 can correspond to the sensor system 50. Therefore, reference is to be made to the example of FIGS. 1 and 2 in the following description of the example of FIG. 3.

The sensor system 150 includes a first cover layer 152, a vibrating-mass 154, and a second cover layer 156. In the example of FIG. 2, the vibrating-mass 154 is demonstrated as substantially planar, with the first cover layer 152 being provided as a layer above the vibrating-mass 154 and the second cover layer 156 being provided as a layer below the vibrating-mass 154. As an example, the vibrating-mass 154 can be a layer of etched silicon, and the first and second cover layers 152 and 156 can each be formed from etched silicon-on-insulator (SOI) layers. The first cover layer 152 and the second cover layer 156 can collectively form part of the housing 18 to which the vibrating-mass 154 can be coupled via spring-mass systems (not shown) to allow for in-plane motion of the vibrating-mass 154 relative to the first and second cover layers 152 and 156, as described previously.

In the example of FIG. 4, the vibrating-mass 154 includes a first array of drive electrodes 160 and a second array of drive electrodes 162 that are disposed on top and bottom surfaces of the substantially planar vibrating-mass 154. Similarly, the first cover layer 152 includes an array of drive electrodes 164 that are disposed on a surface facing the first array of drive electrodes 160, and the second cover layer 156 includes an array of drive electrodes 166 that are disposed on a surface facing the second array of drive electrodes 162. In addition, the first cover layer 152, the vibrating-mass 154, and the second cover layer 156 can each include an array of sense electrodes, similar to as described previously (e.g., with the vibrating-mass including an array on both the top surface and the bottom surface). For example, the sense electrodes can extend longitudinally in orthogonal directions with respect to the drive electrodes 160, 162, 164, and 166, respectively.

Similar to as described previously, the drive electrodes 160 can be arranged as substantially matching the respective array of drive electrodes 164, and the drive electrodes 162 can be arranged as substantially matching the respective array of drive electrodes 166, such as based on dimensions, quantity, and general arrangement. The drive electrodes 160 and 164 and the drive electrodes 162 and 166 can be respectively separated by a distance "D" (e.g., approximately 2 µm). As demonstrated in the example of FIG. 4, the substantially matching sets of drive electrodes 160 and 164 and drive electrodes 162 and 166 are demonstrated as unaligned (e.g., laterally offset) in a rest state of the vibrating-mass 154. Therefore, the drive electrodes 160 and 164 and the drive electrodes 162 and 166 can be capacitively coupled based on an amount of overlap of the respective electrodes along the Y-axis. In the example of FIG. 4, the first cover layer 152 receives a first drive signal $DRV_1$ and a first force-rebalance signal $FRB_1$, and the second cover layer 156 receives a second drive signal $DRV_2$ and a second force-rebalance signal $FRB_2$. As an example, the first and second drive signals $DRV_1$ and $DRV_2$ can correspond to the same signal and the first and second force-rebalance signals $FRB_1$ and $FRB_2$ can correspond to the same signal.

The vibrating-mass 154 is demonstrated as being coupled to a predetermined bias voltage $V_B$, which can thus allow for a sinusoidal attractive electrostatic force to act upon the vibrating-mass 154 in response to the first and second drive signals $DRV_1$ and $DRV_2$ and the first and second force-rebalance signals $FRB_1$ and $FRB_2$. While the bias voltage $V_B$ is demonstrated as being coupled to the vibrating-mass 154, it is to be understood that the bias voltage $V_B$ can instead be coupled to the first and second cover layers 152 and 156. Therefore, the first and second drive signals $DRV_1$ and $DRV_2$ can generate the electrostatic force to provide for the in-plane periodic oscillatory motion of the vibrating-mass 154 along the drive axis and the first and second force-rebalance signals $FRB_1$ and $FRB_2$ can generate the electrostatic force to maintain the vibrating-mass 154 in the null position along the sense axis in response to rotation of the sensor system 150 about the input axis. As an example, each of the first and second drive signals $DRV_1$ and $DRV_2$ and the first and second force-rebalance signals $FRB_1$ and $FRB_2$ can have a frequency that is approximately equal to a resonant frequency of the vibrating-mass 154. Additionally, a carrier signal CA is provided to the vibrating-mass 154. As an example, the carrier signal CA can be generated by the gyroscope controller 14 as an AC voltage having a frequency that is significantly greater than the resonant frequency of the vibrating-mass (e.g., approximately 200 kHz or more). Thus, the carrier signal CA is summed with the predetermined bias voltage $V_B$.

The gyroscope controller 14 can monitor a capacitance associated with an capacitive coupling between the drive electrodes 160 and 164, demonstrated as a signal $D\_PO_1$, and a capacitance associated with an capacitive coupling between the drive electrodes 162 and 166, demonstrated as a signal $D\_PO_2$. Similarly, the gyroscope controller 14 can monitor a capacitance associated with an capacitive coupling between the sense electrodes associated with the vibrating-mass 154 and the first cover layer 152 (e.g., the sense electrodes 62 and 70 in the example of FIG. 2), demonstrated as a signal $F\_PO_1$, and a capacitance associated with an capacitive coupling between the sense electrodes associated with the vibrating-mass 154 and the second cover layer 156 (e.g., the sense electrodes 66 and 74 in the example of FIG. 2), demonstrated as a signal $F\_PO_2$. The signals $D\_PO_1$, $D\_PO_2$, $F\_PO_1$, and $F\_PO_2$ can collectively correspond to the pickoff signals PO in the example of FIG. 1. In response, the gyroscope controller 14 can calculate the magnitude of the first and second drive signals $DRV_1$ and $DRV_2$ required to maintain the in-plane periodic oscillatory motion of the vibrating-mass 154 along the drive axis, and to calculate the magnitude of the first and second force-rebalance signals $FRB_1$ and $FRB_2$ to maintain the vibrating-mass 154 in the null position along the sense axis.

As an example, the gyroscope controller 14 can be configured to demodulate the signals $D\_PO_1$, $D\_PO_2$, $F\_PO_1$, and $F\_PO_2$ at the frequency of the carrier signal CA, such that the demodulated signals $D\_PO_1$, $D\_PO_2$, $F\_PO_1$, and $F\_PO_2$ will have an amplitude that is modulated at approximately the resonant frequency of the vibrating-mass 154 based on the periodic oscillatory motion, angular rotation about the input axis, and/or quadrature effects resulting from a difference in the resonance frequency between the two principle elastic axes. Thus, the gyroscope controller 14 can provide the first and second drive signals $DRV_1$ and $DRV_2$ at an amplitude required to maintain the periodic motion of the vibrating-mass 154 along the drive axis. The gyroscope controller 14 can also provide the first and second force-rebalance signals $FRB_1$ and $FRB_2$ at an amplitude required to maintain the vibrating-mass 154 at a null position along the sense axis, and to substantially mitigate quadrature effects that are exhibited approximately 90° out-of-phase of the angular rotation effects, as provided in the signals $F\_PO_1$, and $F\_PO_2$ (e.g., sine and cosine, respectively). Additionally, because the magnitude of the first and second force-rebalance signals $FRB_1$ and $FRB_2$ can be proportional to the movement of the vibrating-mass 154 along the sense axis in response to rotation about the input axis, the gyroscope controller 14 can calculate the rotation about the input axis ROT based on the calculated magnitude of the first and second force-rebalance signals $FRB_1$ and $FRB_2$ (e.g., in response to the angular rotation modulation on the signals $F\_PO_1$, and $F\_PO_2$).

Based on the arrangement of electrodes 160, 162, 164, and 166, the sensor system 150 can achieve a significant performance improvement over other typical force-rebalance systems that implement motion detection via capacitive coupling, such as those that implement motion electrodes that are move to change an overlapping interdigitation with respect to opposing electrodes (i.e., a "comb" drive configuration). For example, because the electrodes 160, 162, 164, and 166 have a significantly greater area of overlap and smaller gap distance relative to "comb" drive architectures, the sensor system 150 can achieve significantly greater forcing capability and capacitance relative to "comb" drive architectures. In addition, the vibrating-mass 154 can have a significantly greater mass than moving elements in other motion sensing applications (e.g., the "comb" drive architecture), and because the electrodes 160 and 162 can be disposed on opposing surfaces of the vibrating-mass 154, the distance "D" can be very small based on the electrostatic forces being applied substantially equally and oppositely on both surfaces of the vibrating-mass 154. Therefore, for all of these reasons, the associated sensor system (e.g., the sensor system 10) can calculate the angular rotation ROT at a significantly improved signal-to-noise ratio (SNR) relative to typical other motion sensing applications.

Figure 5:
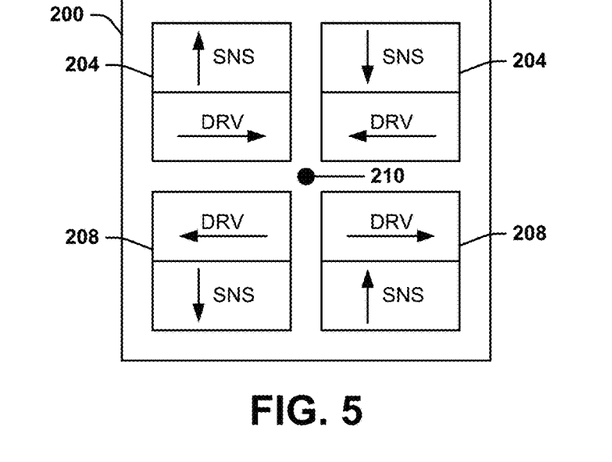
FIG. 5 illustrates an example of a quad-mass sensor system.

FIG. 5 illustrates an example of a quad-mass sensor system 200. The quad-mass sensor system 200 can correspond to the sensor system 12 in the example of FIG. 1. Therefore, reference is to be made to the example of FIG. 1 in the following description of the example of FIG. 5.

The quad-mass sensor system 200 includes a first vibrating-mass 202, a second vibrating-mass 204, a third vibrating-mass 206, and a fourth vibrating-mass 208 that are arranged in pairs. In the example of FIG. 5, the first vibrating-mass 202 and the second vibrating-mass 204 are a first pair of vibrating-masses that are arranged substantially the same but implement motion in opposite directions with respect to each other, and the third vibrating-mass 206 and the fourth vibrating-mass 208 are a second pair of vibrating-masses that are arranged substantially the same but implement motion in opposite directions with respect to each other and 180° out-of-phase with the first and second vibrating masses 202 and 204. For example, the first and second vibrating-masses 202 and 204 can each be configured substantially similar to the vibrating-mass 100 in the example of FIG. 3, and can thus each include an array of drive electrodes 210 and an array of sense electrodes 212.

In response to one or two respective drive signals DRV, the first and second vibrating-masses 202 and 204 can be configured to move in an in-plane periodic oscillatory manner in opposite directions along the drive axis at a given time, such as 180° out-of-phase with respect to each other. Additionally, in response to one or two respective force-rebalance signals FRB, the first and second vibrating-masses 202 and 204 can be configured to maintain a null position along the sense axis based on an electrostatic force that is applied in opposite directions at a given time, such as 180° out-of-phase with respect to each other. Similarly, in response to the drive signal(s) DRV, the third and fourth vibrating-masses 206 and 208 can be configured to move in the in-plane periodic oscillatory manner in opposite directions along the drive axis at a given time, such as 180° out-of-phase with respect to each other.

Additionally, in response to one or two respective force-rebalance signals FRB, the first and second vibrating-masses 202 and 204 can be configured to maintain a null position along the sense axis based on an electrostatic force that is applied in opposite directions at a given time, such as 180° out-of-phase with respect to each other. Thus, the first vibrating-mass 202 is in-phase with the fourth vibrating-mass 208 and out-of-phase with respect to the second and third vibrating-masses 204 and 206, and the second vibrating-mass 204 is in-phase with the third vibrating-mass 206 and out-of-phase with respect to the first and fourth vibrating-masses 202 and 208. Accordingly, based on the opposing motion of the vibrating-masses 202, 204, 206, and 208, the sensor system 200 can be substantially balanced about the input axis passing through an approximate center 210 of the sensor system 200 at a given time.

Figure 6:
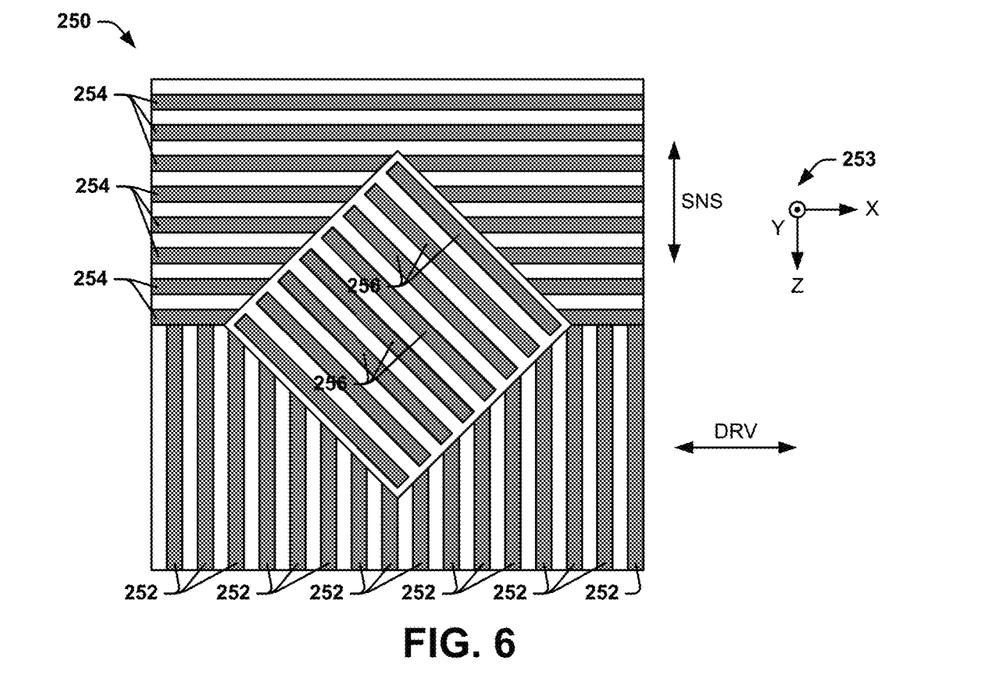
FIG. 6 illustrates another example of a vibrating-mass.

FIG. 6 illustrates another example of a vibrating-mass 250. The vibrating-mass 250 can correspond to the vibrating-mass 56 demonstrated in the example of FIG. 2, such as from an overhead view along the Y-axis of the Cartesian coordinate system 253. Thus, the vibrating-mass 250 is demonstrated in the example of FIG. 6 in a view of either the top surface or the bottom surface of the vibrating-mass 250. The vibrating-mass 250 includes an array of drive electrodes 252 and an array of sense electrodes 254. The drive electrodes 252 and the sense electrodes 254 each extend longitudinally across the surface of the vibrating-mass 250 in a manner such that the drive electrodes 252 extend along the Z-axis and the sense electrodes 254 extend along the X-axis, and thus orthogonally with respect to the drive electrodes 252.

Additionally, the vibrating-mass 250 further includes an array of quadrature electrodes 256 that are arranged at approximately 45° with respect to both the drive electrodes 252 and the sense electrodes 254. The quadrature electrodes 256 can have dimensions that are approximately similar to the dimensions of both the drive electrodes 252 and the sense electrodes 254 with respect to width, depth, and interposing gap width, similar to as described previously with respect to the vibrating-mass 100 in the example of FIG. 3. As an example, the opposite surface of the substantially planar vibrating-mass 250 can likewise include a substantially similar (e.g., equal) arrangement of drive, force-rebalance, and quadrature electrodes (e.g., laterally offset in a rest state of the vibrating-mass 250). In the example of FIG. 6, the array of quadrature electrodes 256 occupy an approximately center of the area of the vibrating-mass 250. However, it is to be understood that the array of quadrature electrodes 256 can be arranged in a variety of locations on the surface of the vibrating-mass 250.

As described previously, the vibrating-mass 250 can correspond to the vibrating-mass 56, and can thus be arranged between the first and second cover layers 54 and 58. As an example, the first and second cover layers 54 and 58 can thus each include arrays of drive and force-rebalance that substantially match the arrays of drive electrodes 252 and sense electrodes 254. Therefore, in response to the drive signal DRV, an electrostatic force can be generated between the drive electrodes 252 and the substantially matching drive electrodes associated with the respective housing to provide for periodic oscillatory movement of the vibrating-mass 250 in the X-Z plane, and specifically along the X-axis corresponding to a drive axis ("DRV"). Similarly, in response to the force-rebalance signal FRB, an electrostatic force can be generated between the sense electrodes 254 and the substantially matching drive electrodes associated with the respective housing to provide force-rebalance of the vibrating-mass in response to movement of the vibrating-mass 250 in the X-Z plane, and specifically along the Y-axis corresponding to a sense axis ("SNS").

In addition, the first and second cover layers 54 and 58 can each include an array of quadrature electrodes that each substantially match the array of quadrature electrodes 256 (e.g., with an approximately equal orientation and angle to substantially optimize an overlap of the quadrature electrodes 256 with the substantially matching quadrature electrodes along the Y-axis). Furthermore, the gyroscope controller 14 can be configured to generate a DC quadrature signal. As an example, the quadrature signal can be applied to the substantially matching quadrature electrodes on the first and second cover layers 54 and 58, such that the vibrating-mass 250 is coupled to the predetermined bias voltage $V_B$. The DC quadrature signal can thus provide a DC electrostatic negative spring force along the angle of the quadrature electrodes 256 in the X-Z plane to substantially match the resonant frequencies in the two principle elastic axes and to counteract quadrature effects that can couple into the force-rebalance signal FRB. Thus, for a vibrating-mass gyroscope that implements the vibrating-mass 250 in the example of FIG. 6, the gyroscope controller 14 does not need to provide sine amplitude modulation in the force-rebalance signals $FRB_1$ and $FRB_2$ to substantially mitigate quadrature effects. DC quadrature control can thus minimize error in the calculation of input angular rate ROT due to the coupling of quadrature effects into the angular rate channel.

For example, fabrication and electronic variations can result in changes in the separation of the resonant frequencies of the drive axis DRV and sense axis SNS of the vibrating-mass 250 due to variation of spring stiffness and mass of the vibrating mass 250. As a result of such frequency separation, a remodulation phase error can couple quadrature effects into the sense axis, and thus affect the magnitude of the generated force-rebalance signal FRB. Because the magnitude of the force-rebalance signal FRB can correspond to rotation of the sensor system 50 about the input axis, such quadrature coupling can create errors in the calculation of the rotation about the input axis ROT. Accordingly, the negative electrostatic spring force that is generated by the DC quadrature signal with respect to the quadrature electrodes 256 can substantially mitigate the quadrature motion, and thus the quadrature coupling into the force-rebalance signal FRB. As a result, the application of the DC quadrature signal with respect to the quadrature electrodes can substantially mitigate quadrature-based errors in the calculation of the rotation about the input axis ROT.

Figure 7:
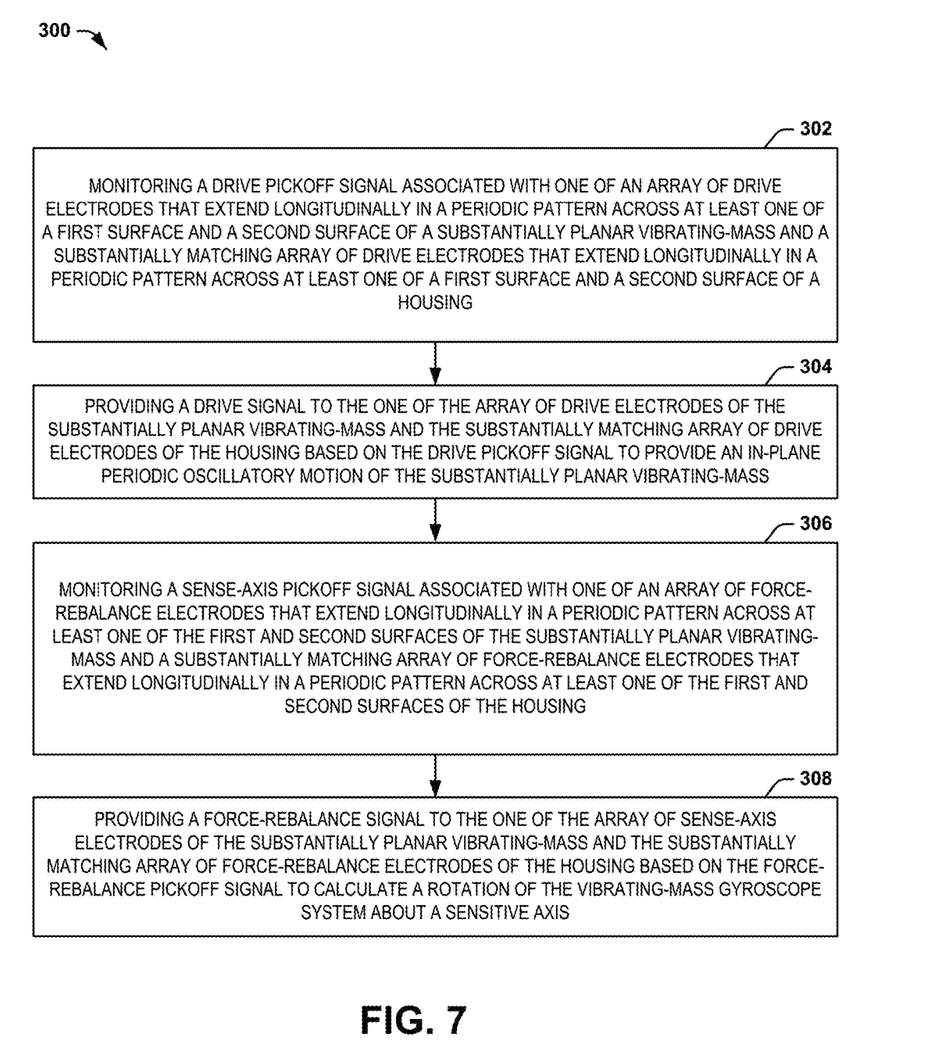
FIG. 7 illustrates an example of a method for calculating rotation about an input axis in a vibrating-mass gyroscope system.

In view of the foregoing structural and functional features described above, a methodology in accordance with various aspects of the present invention will be better appreciated with reference to FIG. 7. While, for purposes of simplicity of explanation, the methodology of FIG. 7 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 7 illustrates an example of a method 300 for calculating rotation about an input axis in a vibrating-mass gyroscope system (e.g., the vibrating-mass gyroscope system 10). At 302, a drive pickoff signal (e.g., the drive pickoff signal D_PO) associated with one of an array of drive electrodes (e.g., the drive electrodes 60 and 64) that extend longitudinally in a periodic pattern across at least one of a first surface and a second surface of a substantially planar vibrating-mass (e.g., the vibrating-mass 56) and a substantially matching array of drive electrodes (e.g., the drive electrodes 68 and 72) that extend longitudinally in a periodic pattern across at least one of a first surface and a second surface of a housing is monitored. The first surface of the substantially planar vibrating-mass faces the first surface of the housing and the second surface of the substantially planar vibrating-mass faces the second surface of the housing (e.g., including the first and second cover layers 54 and 58). At 304, a drive signal (e.g., the drive signal DRV) is provided to the one of the array of drive electrodes of the substantially planar vibrating-mass and the substantially matching array of drive electrodes of the housing based on the drive pickoff signal to provide an in-plane periodic oscillatory motion of the substantially planar vibrating-mass (e.g., in the X-Z plane). At 306, a force-rebalance pickoff signal (e.g., the force-rebalance pickoff signal F_PO) associated with one of an array of sense electrodes (e.g., the sense electrodes 62 and 68) that extend longitudinally in a periodic pattern across at least one of the first and second surfaces of the substantially planar vibrating-mass and a substantially matching array of sense electrodes (e.g., the sense electrodes 70 and 74) that extend longitudinally in a periodic pattern across at least one of the first and second surfaces of the housing. At 308, a force-rebalance signal (e.g., the force-rebalance signal FRB) is provided to the one of the array of sense electrodes of the substantially planar vibrating-mass and the substantially matching array of sense electrodes based on the force-rebalance pickoff signal of the housing to calculate a rotation of the vibrating-mass gyroscope system about an input axis (e.g., the rotation ROT).

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A vibrating-mass gyroscope system comprising:
 a sensor system comprising a substantially planar vibrating-mass comprising a first surface, a second surface opposite the first surface, and a plurality of electrodes that extend longitudinally in a periodic pattern across at least one of the first and second surfaces, the plurality of electrodes comprising an array of drive electrodes and an array of sense electrodes that are capacitively coupled to a substantially matching array of drive electrodes and a substantially matching array of sense electrodes, respectively, associated with a housing and which are separated from and facing the respective at least one of the first and second surfaces; and
 a gyroscope controller configured to generate a drive signal that is provided to one of the array of drive electrodes and the substantially matching array of drive electrodes to provide for an in-plane periodic oscillatory motion of the substantially planar vibrating-mass, is configured to receive a pickoff signal from one of the array of sense electrodes and the substantially matching array of sense electrodes that indicates motion of the substantially planar vibrating-mass resulting from rotation of the vibrating-mass gyroscope system, and configured to generate a force-rebalance signal that is provided to the one of the array of sense electrodes and the substantially matching array of sense electrodes to provide electrostatic force to null the motion of the substantially planar vibrating-mass and to calculate a rotation of the vibrating-mass gyroscope system about an input axis.

2. The system of claim 1, wherein the array of drive electrodes and the array of sense electrodes are each arranged longitudinally in the periodic pattern in respective orthogonal axes with respect to each other, and wherein the substantially matching array of drive electrodes and the substantially matching array of sense electrodes are each arranged longitudinally in the periodic pattern in respective orthogonal axes with respect to each other.

3. The system of claim 2, wherein the substantially planar vibrating-mass further comprises an array of quadrature electrodes arranged at a 45° angle with respect to each of the sets of drive and sense electrodes, and wherein the housing further comprises a substantially matching array of quadrature electrodes arranged at a 45° angle with respect to each of the substantially matching sets of drive and sense electrodes, wherein the gyroscope controller is further configured to generate a quadrature signal that is provided to one of the array of quadrature electrodes and the substantially matching array of quadrature electrodes to substantially mitigate quadrature coupling into the force-rebalance signal.

4. The system of claim 1, wherein the substantially planar vibrating-mass comprises a first array of drive electrodes and a first array of sense electrodes on the first surface and comprises a second array of drive electrodes and a second array of sense electrodes on the second surface, and wherein the housing comprises a first substantially matching array of drive electrodes and a first substantially matching array of sense electrodes respectively separated from and facing the first surface and comprises a second substantially matching array of drive electrodes and a second substantially matching array of sense electrodes respectively separated from and facing the second surface.

5. The system of claim 1, wherein the drive signal is provided to the one of the array of drive electrodes and the substantially matching array of drive electrodes to provide for the in-plane periodic oscillatory motion of the substantially planar vibrating-mass in a direction that is orthogonal with respect to a force that is generated in response to the force-rebalance signal in response to rotation of the vibrating-mass gyroscope system about the input axis.

6. The system of claim 1, wherein the sensor system comprises a plurality of substantially planar vibrating-masses arranged in pairs, each of the plurality of substantially planar vibrating-masses comprising a first surface, a second surface opposite the first surface, and a plurality of electrodes that extend longitudinally in a periodic pattern across at least one of the first and second surfaces.

7. The system of claim 6, wherein the gyroscope controller is configured to generate the drive signal to provide for the in-plane periodic oscillatory motion of each of the plurality of substantially planar vibrating-masses in a manner that is out-of-phase by 180° with respect to a given pair, and wherein the gyroscope controller is configured to generate the force-rebalance signal to generate a force in alternate and opposite directions for each of the plurality of substantially planar vibrating-masses with respect to a given pair.

8. The system of claim 1, wherein the vibrating-mass is coupled to the housing via at least one spring-mass system, wherein the gyroscope controller is configured to generate a carrier signal having a frequency that is greater than a resonant frequency of the at least one spring-mass system, wherein the drive signal and the force-rebalance signal are generated at a frequency that is approximately equal to the resonant frequency of the at least one spring-mass system based on demodulating the pickoff signal associated with the plurality of electrodes at the frequency of the carrier signal.

9. A method for calculating rotation about an input axis in a vibrating-mass gyroscope system, the method comprising:
 monitoring a drive pickoff signal associated with one of an array of drive electrodes that extend longitudinally in a periodic pattern across at least one of a first surface and a second surface of a substantially planar vibrating-mass and a substantially matching array of drive electrodes that extend longitudinally in a periodic pattern across at least one of a first surface and a second surface of a housing, wherein the first surface of the substantially planar vibrating-mass faces the first surface of the housing and the second surface of the substantially planar vibrating-mass faces the second surface of the housing;

providing a drive signal to the one of the array of drive electrodes of the substantially planar vibrating-mass and the substantially matching array of drive electrodes of the housing based on the drive pickoff signal to provide an in-plane periodic oscillatory motion of the substantially planar vibrating-mass;

monitoring a force-rebalance pickoff signal associated with one of an array of sense electrodes that extend longitudinally in a periodic pattern across at least one of the first and second surfaces of the substantially planar vibrating-mass and a substantially matching array of sense electrodes that extend longitudinally in a periodic pattern across at least one of the first and second surfaces of the housing, the force-rebalance pickoff signal indicating motion of the substantially planar vibrating-mass resulting from rotation of the vibrating-mass gyroscope system; and providing a force-rebalance signal to the one of the array of sense electrodes of the substantially planar vibrating-mass and the substantially matching array of sense electrodes of the housing based on the force-rebalance pickoff signal to provide electrostatic force to null the motion of the substantially planar vibrating-mass and to calculate a rotation of the vibrating-mass gyroscope system about an input axis.

10. The method of claim 9, wherein the array of drive electrodes and the array of sense electrodes are each arranged longitudinally in the periodic pattern in respective orthogonal axes with respect to each other across the at least one of the first and second surfaces of the respective substantially planar vibrating-mass and the housing, and wherein the substantially matching array of drive electrodes and the substantially matching array of sense electrodes are each arranged longitudinally in the periodic pattern in respective orthogonal axes with respect to each other across the at least one of the first and second surfaces of the respective substantially planar vibrating-mass and the housing.

11. The method of claim 9, further comprising:
generating a DC quadrature signal; and
providing the DC quadrature signal to one of an array of quadrature electrodes that extend longitudinally in a periodic pattern across at least one of the first and second surfaces of the substantially planar vibrating-mass and a substantially matching array of sense electrodes that extend longitudinally in a periodic pattern across at least one of the first and second surfaces of the housing to substantially mitigate quadrature coupling into the force-rebalance signal.

12. The method of claim 9, wherein providing the drive signal comprises providing the drive signal to the one of the array of drive electrodes and the substantially matching array of drive electrodes to provide for the in-plane periodic oscillatory motion of the substantially planar vibrating-mass in a first direction, and wherein providing the force-rebalance signal comprises providing the force-rebalance signal to the one of the array of sense electrodes and the substantially matching array of sense electrodes to provide a force that is generated in response to the force-rebalance signal in a second direction orthogonal to the first direction based rotation of the vibrating-mass gyroscope system about the input axis.

13. The method of claim 9, wherein providing the drive signal comprises providing the drive signal to the one of the array of drive electrodes and the substantially matching array of drive electrodes associated with a plurality of substantially planar vibrating-masses arranged in pairs to provide for the in-plane periodic oscillatory motion of each of the plurality of substantially planar vibrating-masses that is out-of-phase by 180° with respect to a given pair, and wherein providing the force-rebalance signal comprises providing the force-rebalance signal to the one of the array of sense electrodes and the substantially matching array of sense electrodes associated with the plurality of substantially planar vibrating-masses to provide a force in alternate and opposite directions with respect to a given pair.

14. A vibrating-mass gyroscope system comprising:
a sensor system comprising a plurality of substantially planar vibrating-masses that each comprise a first surface, a second surface opposite the first surface, and a plurality of electrodes that extend longitudinally in a periodic pattern across each of the first and second surfaces, the plurality of electrodes comprising an array of drive electrodes and an array of sense electrodes that are capacitive coupled to a substantially matching array of drive electrodes and a substantially matching array of sense electrodes, respectively, associated with a housing and which are separated from and facing the respective at least one of the first and second surfaces of each of the plurality of vibrating-masses; and
a gyroscope controller configured to generate a drive signal that is provided to one of the array of drive electrodes and the substantially matching array of drive electrodes associated with each of the plurality of vibrating-masses to provide for an in-plane periodic oscillatory motion of each of the plurality of substantially planar vibrating-masses, is configured to receive a pickoff signal from one of the array of sense electrodes and the substantially matching array of sense electrodes that indicates motion of each of the respective plurality of vibrating-masses resulting from rotation of the vibrating-mass gyroscope system, and to generate a force-rebalance signal that is provided to the one of the array of sense electrodes and the substantially matching array of sense electrodes associated with each of the plurality of vibrating-masses to provide electrostatic force to null the motion of each of the respective plurality of vibrating-masses and to calculate a rotation of the vibrating-mass gyroscope system about an input axis.

15. The system of claim 14, wherein the array of drive electrodes and the array of sense electrodes associated with each of the plurality of vibrating-masses are each arranged longitudinally in the periodic pattern in respective orthogonal axes with respect to each other on each of the first and second surfaces of each of the respective plurality of vibrating-masses, and wherein the substantially matching array of drive electrodes and the substantially matching array of sense electrodes on the housing and respectively associated with each of the first and second surfaces of each of the plurality of substantially planar vibrating-masses are each arranged longitudinally in the periodic pattern in respective orthogonal axes with respect to each other.

16. The system of claim 14, wherein the plurality of substantially planar vibrating-masses are arranged in pairs, wherein the gyroscope controller is configured to generate the drive signal to provide for the in-plane periodic oscillatory motion of each of the plurality of substantially planar vibrating-masses in a manner that is out-of-phase by 180° with respect to a given pair, and wherein the gyroscope controller is configured to generate the force-rebalance signal to generate a force in alternate and opposite directions for each of the plurality of substantially planar vibrating-masses with respect to a given pair.

* * * * *